US005128020A

United States Patent [19]

Yamauchi et al.

[11] Patent Number: 5,128,020

[45] Date of Patent: Jul. 7, 1992

[54] GAS DETECTOR

[75] Inventors: Shiro Yamauchi; Masao Izumo; Shoji Tada, all of Amagasaki, Japan

[73] Assignee: Mitsubishi Denki Kabushiki Kaisha, Tokyo, Japan

[21] Appl. No.: 664,429

[22] Filed: Mar. 4, 1991

Related U.S. Application Data

[63] Continuation of Ser. No. 424,997, Oct. 23, 1989, abandoned.

[30] Foreign Application Priority Data

Oct. 24, 1988 [JP] Japan ............................ 63-267392

[51] Int. Cl.[5] ........................................ G01N 27/26

[52] U.S. Cl. .................................. 204/424; 204/421; 204/431; 204/153.13

[58] Field of Search ............ 204/424, 421, 431, 153.13

[56] References Cited

U.S. PATENT DOCUMENTS 4,188,266 2/1980 Forman .......................... 204/421 X
4,661,211 4/1987 Petty-Weeks ...................... 204/1 T
4,886,584 12/1989 Cheng ............................ 204/153.1

FOREIGN PATENT DOCUMENTS 207952 9/1987 Japan .
311164 12/1988 Japan .

OTHER PUBLICATIONS

Electric Power Research Institute Report, Oct. 1982, extracted pp. 1-1 through 1-10.
International Conference on Solid-State Sensors and Actuators, Jun. 85, New York, pp. 340-342, N. Yamazoe, "Development of Proton Conductor Gas Sensor", p. 343, FIG. 7.
E. C. Subbarao, "Solid Electrolytes and Their Applications", pp. 57-63 & 286, (1980).

*Primary Examiner*—John Niebling
*Assistant Examiner*—Arun S. Phasge
*Attorney, Agent, or Firm*—Oblon, Spivak, McClelland, Maier & Neustadt

[57] ABSTRACT

A gas detector for detecting the decomposed $SF_6$ gas produced by discharge in gas-insulated equipment. The gas detector operates as a cell generating voltage in proportion to the amount of the decomposed $SF_6$ gas wherein the voltage is generated between the detection electrode including Ag, reacting upon contact by the decomposed gas and the opposing electrode including Ag also, both electrodes sandwiching the ionic conductive solid electrolyte layer including Ag ion therebetween.

5 Claims, 3 Drawing Sheets

GAS DETECTOR

This application is a continuation of application Ser. No. 07/424,997 filed on Oct. 23, 1989, now abandoned.

FIELD OF THE INVENTION AND RELATED ART STATEMENT

1. Field of the Invention

The present invention relates generally to a gas detector for detecting the decomposed $SF_6$ gas produced by electric discharging in gas-insulated equipment.

2. Description of the Related Art

A wet method or a dry method is known as a conventional method for detecting the decomposed $SF_6$ gas produced by discharge in gas-insulated equipment. In the wet method, decomposed $SF_6$ gas produced by discharge such as $SF_4$ absorbed in alkali-absorbing solution is detected as ions of fluorine by an absorptiometric method (JAPAN ANALYST Vol. 16, P44(1967)). In another wet method, acid and acid producing constituents in the sample which contains decomposed $SF_6$ gas are absorbed in a standard alkali solution and the excess alkali is back-titrated with a standard sulphuric acid solution (IEC (INTERNATIONAL ELECTROTECHNICAL COMMISSION) RECOMMENDATION Publication 376 "Specification and acceptance of new sulphur hexafluoride").

The wet method requires a large amount of equipment such as a gas-liquid contact equipment for absorbing decomposed $SF_6$ gas in the absorbing solution and an absorptiometer for measuring fluorine ion or a titrator (cf. a buret) for measuring components in the absorbing solution. Thus, there are shortcomings due to the fact that a large amount of equipment and complicated measurements are required in the wet method.

In the dry method, a gas detecting tube which encloses an element showing coloration by reaction with the integrated $SF_6$ gas is shown in Japanese examined publication Tokko sho 57-38091. The gas detecting tube of the dry method is small-sized and light weight and enables easy measurement.

Although, the dry method makes it easy to carry out the measurement, it is necessary for a man to observe the coloration, since the gas detecting tube has no conversion function from change of the coloration to an electric signal. Thus it is not suitable for use of unmanned continuous measurement.

OBJECT AND SUMMARY OF THE INVENTION

The object of the present invention is to provide a gas detector which is small-sized and light weight and enables easy measurement of decomposed $SF_6$ gas amount by an electric signal.

A gas detector in accordance with the present invention comprises;

a detecting electrode having a surface exposed to objective gas and containing at least a metal element, an ionic conductive solid electrolyte layer which is formed on said detecting electrode and contains ions of said metal element, an opposing electrode which is formed on said ionic conductive solid electrolyte layer and contains said metal element, an insulative support means supporting said detecting electrode, said ionic conductive solid electrolyte layer and said opposing electrode, and isolating said ionic conductive solid electrolyte layer from said opposing electrode from gas, a first electric terminal connected with said detecting electrode and, a second electric terminal connected with said opposing electrode.

In the gas detector of the present invention, the gas detector operates as a cell for generating voltage in proportion to the amount of the decomposed $SF_6$ gas. The voltage is generated between the detecting electrode for reacting with the integrated gas and the opposing electrode wherein both electrodes sandwich the ionic conductive electrolyte layer therebetween. Thus a small-sized and light-weighted gas detector which needs no external electric power source and enables unmanned continuous measurement is obtained.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter the present invention is illustrated in detail with reference to the accompanying figures of FIG. 1 through FIG. 3 whereby the preferred embodiments are shown.

[First embodiment]

Figure 1:
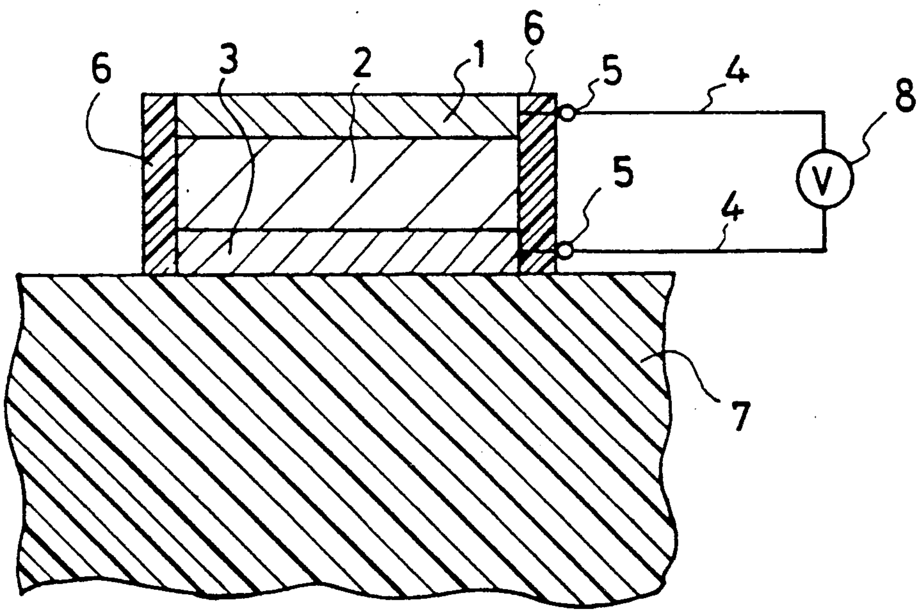
FIG. 1 is a sectional view showing a gas detector embodying the present invention.

A first preferred embodiment of the present invention is elucidated hereafter with reference to FIG. 1.

FIG. 1 shows a detecting electrode 1 which is made of a deposition layer of Ag for reacting with the decomposed $SF_6$ gas and an opposing electrode 3 which is also made of a deposition layer of Ag. An ionic conductive solid electrolyte layer 2 such as $Ag_3SI$ including Ag ion is sandwiched between the opposing electrodes 1 and 3. When there is no object gas which is decomposed $SF_6$ gas, namely before a gas detector detects the object gas, there exists no electric potential difference between the detecting electrode 1 and the opposing electrode 3, since both electrodes 1 and 3 are made of the same material (metal) Ag.

Since the opposing electrode 3 and the ionic conductive solid electrolyte layer 2 are formed on the substrate 7 which is made of alumina, and further the opposing electrode 3 and the layer 2 are surrounded with the insulator 6 and/or the detecting electrode 1, there is no exposed surface of the opposing electrode 3 to $SF_6$ gas atmosphere. Thereby, only the outside surface of the detecting electrode 1 is exposed to $SF_6$ gas atmosphere. When the object gas, namely decomposed $SF_6$ gas, is produced by discharge in $SF_6$ gas, $SF_6$ is decomposed into $SF_4$ gas, $SF_2$ gas, F(fluorine) and/or S(sulfur). Some Ag in the detecting electrode 1 is converted to AgF (Silver Fluoride) through the following reaction with F produced in the decomposed $SF_6$ gas.

$$\frac{1}{2}F_2 \text{ (produced in } SF_6 \text{ gas)} + Ag \rightarrow AgF \quad (1)$$

Then a galvanic cell comprising AgF on the detecting electrode 1 as cathode active material, Ag in the opposing electrode 3 as anode active material and the solid electrolyte layer 2 as what is called electrolytic solid solution is formed as shown in following reaction formulas.

$$\underset{\text{(Anode)}}{Ag} \ | \ \underset{\text{(Electrolyte)}}{Ag_3SI} \ | \ \underset{\text{(Cathode)}}{AgF} \quad (2)$$

Reaction formula on the anode; $Ag \rightarrow Ag^{+} + e^{-}$ (3)

Reaction formula on the cathode; $\frac{1}{2}F_2(\text{gas}) + e^{-} \rightarrow F^{-}$ (4)

$$Ag + \frac{1}{2}F_2 \rightarrow AgF \quad (5)$$

Thus the electric potential difference between the detecting electrode 1 and the opposing electrode 3 occurs in accordance with the amount of AgF converted on the detecting electrode 1. The electric potential difference is measured by a voltmeter 8 through terminals 5,5 and leads 4,4. The following equation (6) between measured voltage V (volt) and concentration of the decomposed gas L (%) bold is known.

$$V = A + B\log L \quad (6)$$

wherein A, B are constant.

In the equation (6), constants A and B are obtained experimentally. Thus the amount of decomposed $SF_6$ gas can be estimated from the measured electric potential difference. Our experiment shows that a voltage of several $\mu V$ is measured from a concentration of several ppm of the decomposed $SF_6$ gas.

As to the above-mentioned gas detector, the method for making the gas detector is elucidated hereafter briefly.

The opposing electrode 3 about 3 $\mu m$ thick Ag layer is formed on the substrate 7 made of alumina by sputtering or deposition. Next, in an electric heater, the Ag layer on the substrates is reacted with mixed gas of hydrogen sulfide and air in volume ratio of about 1:3 at about 200° C. In this heat reaction, the surface of the Ag layer is converted to silver sulfide. Then the substrate 7 is put in a closed vessel together with iodine. Reaction period with iodine is controlled so that iodine as silver iodine is contained in the ratio of 1:1 on silver sulfide, by measuring the weight increase of the substrate 7. Next, the substrate 7 is heated in $N_2$ gas at a temperature of 300° C.~400° C. Through the above-mentioned reactions, the surface of the Ag layer is converted finally to the $Ag_3SI$ layer for the solid electrolyte layer 2. The depth of the Ag composed layer produced by the reaction, namely the thickness of the $Ag_3SI$ layer is controlled to be about 2 $\mu m$ changing condition such as period and temperature of the above-mentioned reactions on the basis of data given by experiments. An Ag layer of about 1 $\mu m$ thickness for detection electrode 1 is formed by sputtering or deposition on the $Ag_3SI$. Then the substrate 7 is cut to obtain the desired size as a gas detector. After bonding Au wires as leads 4, 4 and terminals 5, 5 for both electrodes 1 and 3, an alumina layer as an insulator 6 is formed by sputtering while masking the surface of the detecting electrode 1.

[Second embodiment]

Figure 2:
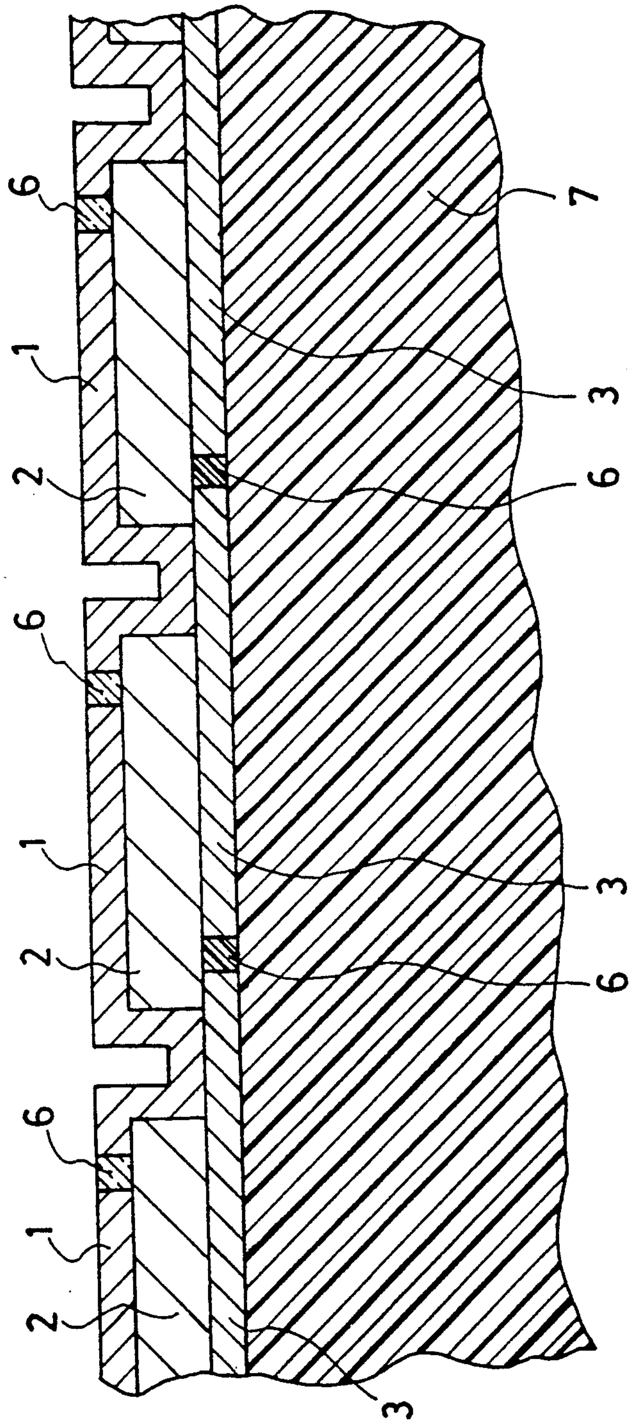
FIG. 2 is a sectional view showing a gas detector integration embodying the present invention.
Figure 3:
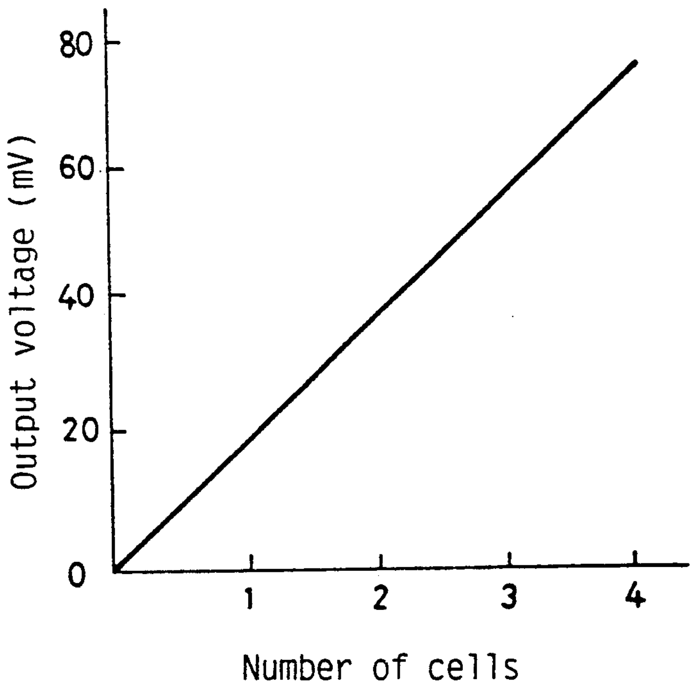
FIG. 3 is a graph showing a relation of the output voltage of the gas detector integration and the number of cells therein.

A second preferred embodiment of the present invention is elucidated hereafter with reference to FIG. 2 and FIG. 3.

In FIG. 2, a grouped gas detector integration comprising two or more gas detectors is shown. Corresponding parts and components to the first embodiment are shown by the same numerals and marks, and the description thereon made in the first embodiment similarly apply. Differences and features of this second embodiment from the first embodiment are as follows. The gas detector integration has a constitution of a row of cells of FIG. 1, and electric serial connection is made by connecting detection electrodes 1, 1,—with respective opposing electrodes 3, 3—of the next cells, like a series connected accumulated battery. An output voltage of the gas detector integration is multiplied by the number of cells therein. A relation of the output voltage of the gas detector integration and the numbers of the series connected cells therein is shown in FIG. 3. Thus, the gas detector integration produced a high output voltage unable as a high accurate gas detector. The method for making the gas detector integration is substantially the same as the above-mentioned method of the first embodiment.

In the embodiment of FIG. 1 and FIG. 2, ions of Ag are carriers of electric charge, since both electrodes comprises Ag and solid electrolyte is made of $Ag_3SI$. An electric conductor of mixed metal ion and electron such as $Ag_2S$ or $Ag_XMo_8S_8$ which is an electric conductor of mixed Ag ions and electrons can be used for material of electrodes 1 and 3. Also other Ag ion conductive solid electrolytes, such as $Ag_4RbI_5$ $Ag_6IWO_4$ can be used for the ionic conductive solid electrolyte layer 2.

Instead of Ag ions, Cu ions can be used as carrier of electric charge, and in this case both electrodes are made of a compound of Cu. As an example, the detecting electrode 1 is made of Cu, the opposing electrode 3 is made of copper sulfide ($Cu_2S$) and the ionic conductive solid electrolyte layer 2 is made of $Rb_4Cu_{16}I_7Cl_{13}$.

The embodiments for objective gas of decomposed $SF_6$ gas has been described; however other gases which make reaction with Ag or Cu such as gas of $H_2S$, $F_2$, $Br_2$, $Cl_2$ and so on can be detected by the present gas detector.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A gas detector comprising:

a detecting electrode having a surface exposed to objective gas and containing at least a deposition layer of a metal element in a free state for reacting with said objective gas;

an ionic conductive solid electrolyte layer formed on said detecting electrode and containing ions of said metal element;

an opposing electrode which is formed on said ionic conductive solid electrolyte layer and containing a deposition layer of said metal element;

an insulative support means for supporting said detecting electrode, said ionic conductive solid electrolyte layer and said opposing electrode, and isolating said ionic conductive solid electrolyte layer and said opposing electrode from gas;

a first electric terminal connected with said detecting electrode; and a second electric terminal connected with said opposing electrode.

2. A gas detector according to claim 1, comprising, in combination, a second identical gas detector connected in series connection thereto, said insulative support means and said detecting electrode of each of said gas detectors in said series connection isolating said ionic conductive solid electrolyte electrode and said opposing layer of each of said gas detectors in said series connection from gas;

said gas detectors being provided in said series connection such that a detecting electrode of one gas detector is connected to an opposing electrode of the next gas detector.

3. A gas detector in accordance with claim 1, wherein said detecting electrode is an electric conductor comprising mixed metal ions and electrons.

4. A gas detector in accordance with claim 1 or 3, wherein said metal element is Ag.

5. A gas detector in accordance with claim 1 or 3, wherein said metal element is Cu.

* * * * *